United States Patent [19]

Schonfelder

[11] 4,159,086

[45] Jun. 26, 1979

[54] WING CONSTRUCTION FOR SURFACE EFFECT VEHICLE

[75] Inventor: Dietmar Schönfelder, Heinsberg, Fed. Rep. of Germany

[73] Assignee: Rhein-Flugzeugbau GmbH, Mönchen-Gladbach, Fed. Rep. of Germany

[21] Appl. No.: 602,316

[22] Filed: Aug. 6, 1975

[30] Foreign Application Priority Data

Aug. 9, 1974 [DE] Fed. Rep. of Germany ....... 2438307

[51] Int. Cl.² .............. B6OV 3/08; B63B 1/16; B64C 1/04; B64C 3/38
[52] U.S. Cl. .................. 244/12.1; 180/117; 244/49; 244/105; 114/271; 114/284
[58] Field of Search .............. 244/12 R, 105, 107, 244/47–49, 38; 114/271, 272, 273, 283, 284; 180/116, 117, 125, 126

[56] References Cited

U.S. PATENT DOCUMENTS

| 1,175,307 | 3/1916 | Schroeder | 244/47 |
| 1,776,700 | 9/1930 | Pegna | 114/66 S H |
| 1,834,858 | 12/1931 | Metzler | 244/47 |
| 2,010,817 | 8/1935 | Henry | 244/107 |
| 2,186,558 | 1/1940 | Rouanet et al. | 244/38 |
| 3,190,582 | 6/1965 | Lippisch | 244/12 R |

FOREIGN PATENT DOCUMENTS

746767 6/1933 France ................ 244/105

*Primary Examiner*—Galen L. Barefoot
*Attorney, Agent, or Firm*—Smyth, Pavitt, Siegemund, Jones & Martella

[57] ABSTRACT

A surface vehicle has two wings, which are hinged to a wing core along axes extending along the wing center axis, to change the angle of attack, so that the trailing wing edges as extending towards the rear in converging configuration remain in a common plane and close the plenum chamber with reference to the (hypothetical) mirror image of the wing construction.

3 Claims, 4 Drawing Figures

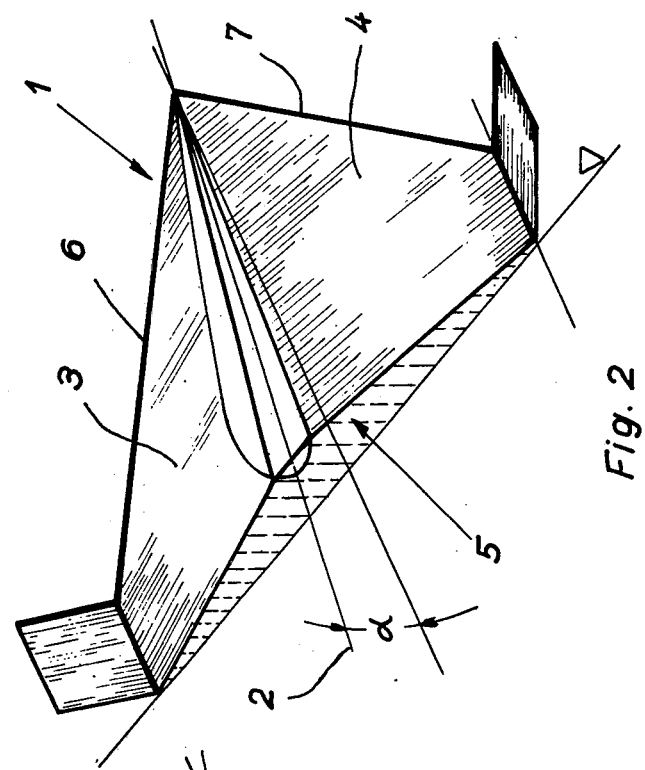
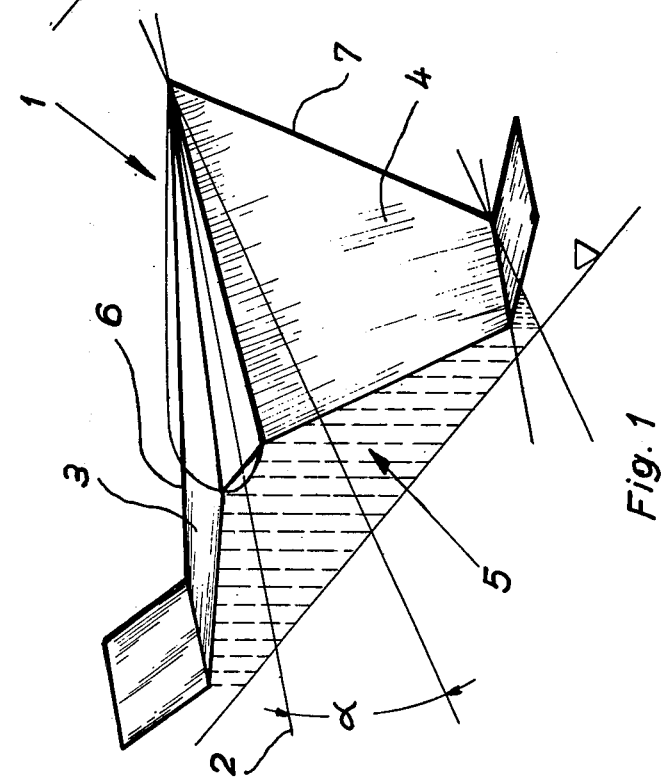

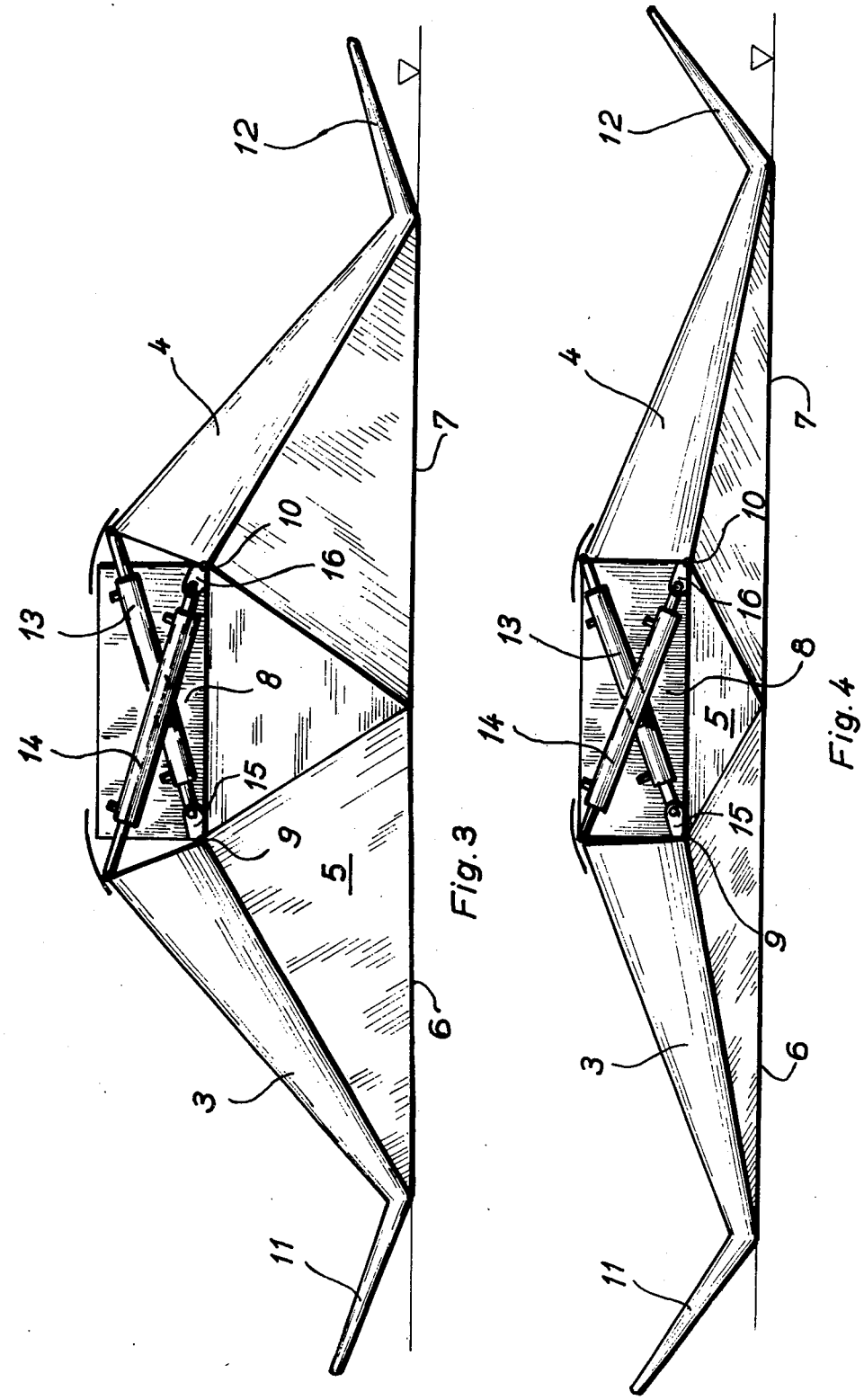

WING CONSTRUCTION FOR SURFACE EFFECT VEHICLE

BACKGROUND OF THE INVENTION

The present invention relates to a wing construction for winged surface effect vehicles, whereby a plenum is developed in a chamber open in the direction of movement of the vehicle.

Surface effect vehicles are known having single surface wings which form such a plenum chamber and wherein the rear edges of the wing are joint in the rear to establish a triangle. These vehicles have significant efficiency when taking advantage of the surface effect, because lift is produced in two, mutually reinforcing ways. Firstly, lift is produced by the air cushion which develops under the wing in the plenum; secondly, the wing experiences a speed dependent aerodynamic lift.

A particularly known craft has a reversed delta wing, wherein the plenum is established by a negative V and is closed by the rear edges of the wing with respect to the mirror image of the wing. However, it was found that the thus predetermined and fixed wing geometry is or can be optimized for a particular operational state and flight condition only. Different velocities of the craft, particularly when flying close to ground, result in less than optimum states. Accordingly, the front of the craft has to be lowered for higher speeds to maintain the surface effect effective. Since the rear of the wing is lifted, the plenum is opened to some extent in that the rear edges of the wing remain no longer parallel to the mirror image of the craft. The lift is, therefore, reduced and, most importantly, the stability of the craft deteriorates. Another deficiency of a fixed wing geometry is to be seen in the fact that matching the craft to optimum conditions for takeoff and landing over water is not possible.

DESCRIPTION OF THE INVENTION

It is an object of the present invention to provide a new and improved wing construction for surface effect vehicles which permits adjustment of the wing geometry to the operational requirements and conditions needed for optimum efficiency.

In accordance with the preferred embodiment of the invention, it is suggested that the wing construction includes two wings which are pivotably arranged for pivoting about axes which extend generally along the center axis of the wing construction as a whole, whereby rear edges of the wings converge towards the rear and remain in a common plane, closing the plenum with respect to the hypothetical mirror image of the craft; the plenum being developed underneath the wings and is open towards the front.

If the angle of attack is changed, these two rear edges still close the plenum chamber towards the rear and with respect to the mirror image of the wing. The angle of attack is taken with reference to that plane. As a consequence, the vehicle has significant stability.

In furtherance of the invention, it is suggested to provide a central wing core to which the wings are hinged, and hydraulic drives position and adjust the wings.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings, in which:

FIG. 1 is a schematic drawing and perspective view of a wing constructed in accordance with the preferred embodiment of the invention;

FIG. 2 is similar to FIG. 1 showing, however, the wing adjusted to assume a smaller angle of attack;

FIG. 3 is a front view of a wing in accordance with the preferred embodiment; and FIG. 4 is a similar front view, but showing the wings with a smaller angle of attack.

Proceeding now to the detailed description of the drawing, the FIGS. 1 and 2 show a wing with a center axis 2 extending in the direction of the flight. The craft moves, in the drawings, from upper right to lower left. Two wings 3 and 4 are arranged to one side and the other of an axis 2. These parts are arranged, when considering a plane transverse to the axis 2, as an upside down V. However, the V has a flat bottom (top in the upside down version) and the wings extend actually from hinge axes 9 and 10 which extend along axis 2 but in converging configuration.

The legs of the V become shorter towards the rear. Accordingly, a plenum chamber 5 is developed which is open at the front, but bounded towards the rear (and along the sides) by the trailing edges 6 and 7 respectively of wing parts 3 and 4. These edges 6 and 7 converge towards the rear and extend in a common plane. In other words, the lines defined by the edges 6 and 7 of the wing establish a plane which is a reference and bottom plane for the plenum chamber. If one considers this plane to be an imaging plane, then the plenum chamber is and remains closed along edges 6 and 7 with respect to the mirror image of the wings.

The two FIGS. 1 and 2 differ as to the angle of attack α. FIG. 1 shows a large angle of attack corresponding to a surface effect flight at a low velocity. The two rear edges 6 and 7 coincide with their mirror image and limit the plenum 5. FIG. 2 shows the craft for a small angle of attack α during high speed flight. For this, the two wings were adjusted in that the angle between the legs of the V as defined above was increased, i.e. the V was flattened. However, the edges 6 and 7 still coincide with their mirror image and the plenum chamber remains closed in the rear accordingly, thereby closing the plenum chamber in aft direction within the meaning defined above upon complementing the wings (hypothetically) by their mirror image.

The illustration of the embodiment as shown in FIGS. 3 and 4 differs from the more schematic showing of FIGS. 1 and 2 in that the wings 3 and 4 are shown in greater detail as being hinged to a wing-core 8; reference numerals 9 and 10 refer to the respective hinge axes. These axes 9 and 10 intersect in the rear, the bottom of wing core 8 is of triangular configuration accordingly. The wings 3 and 4 have respectively assist surfaces 11 and 12 at their ends. The plenum 5 is defined here by the bottom surfaces of wings 3 and 4 and by the bottom of wing core 8.

Adjustment and positioning piston cylinder drives 13 and 14 are provided for adjusting the angle between wings 3 and 4 on one hand and core 8 on the other hand, whereby the angle between the wings 3 and 4 is adjusted accordingly. The drives are connected respectively with one end to links 15 and 16 at the hinge axis for the respective other wing, and to the wings which they are to pivot. The drives 13 and 14 are disposed behind each other and have crosswise orientation. Alternatively, one could use a single drive which acts on both of the wings and extends between them.

Upon adjusting the wings 3 and 4 to assume an angle relative to each other different from the respective previous angle, the geometry of the wing configuration as a whole is changed. The adjustment affects also the angle between the trailing edges 6 and 7, but the common plane retains its orientation, so that the angle of attack α is changed. However, the plenum 5 remains closed, always through the edges 6 and 7 and with respect to the mirror image of the wing configuration. The image plane extends transverse to the plane of the drawing of FIGS. 3 and 4, through the lines 6, 7. The two wings 3 and 4 are uniformly adjusted to maintain a symmetric disposition between them in relation to a plane transverse to the plane of edges 6 and 7.

The invention is not limited to the embodiments described above, but all changes and modifications thereof not constituting departures from the spirit and scope of the invention are intended to be included.

I claim:

1. Wing construction for surface effect vehicle comprising:
    two wings, each having an underside with a front edge, an edge with a hinge axis and a lateral rear edge, the rear edges converging towards the rear to establish a bottom plane for a plenum chamber defined by the undersides of the wings, the two hinge axes together being inclined to said plane corresponding to an angle of attack, so that said plenum chamber is open at the front, but remains closed along said rear edges with respect to the hypothetical mirror image of the wings; and
    means for pivoting said wings about said hinge axes for changing the geometry of the wing including the angle of attack.

2. Wing construction as in claim 1, wherein a wing core is provided, to which said wings are linked along said hinge axes.

3. Wing construction as in claim 1, said means including at least one piston cylinder drive.